United States Patent [19]

Blaimschein

[11] 4,215,604
[45] Aug. 5, 1980

[54] MILLING MACHINE

[75] Inventor: Gottfried Blaimschein, Steyr, Austria

[73] Assignee: GFM Gesellschaft fur Fertigungstechnik und Maschinenbau Aktiengesellschaft, Steyr, Austria

[21] Appl. No.: 959,051

[22] Filed: Nov. 8, 1978

[30] Foreign Application Priority Data

Nov. 22, 1977 [AT] Austria .................... 8329/77

[51] Int. Cl.² .......................... B23B 5/00; B23B 5/18; B23B 3/28
[52] U.S. Cl. ............................. 82/20; 82/9; 82/19
[58] Field of Search .............. 82/2 E, 8, 9, 14 R, 82/18, 19, 20; 90/15 R, 15 A, 15 B, 15.1

[56] References Cited

U.S. PATENT DOCUMENTS

| 1,542,803 | 6/1925 | Gordon et al. | 82/19 |
| 1,916,581 | 7/1933 | O'Brien | 82/19 |
| 2,124,347 | 7/1938 | Groene et al. | 82/19 |
| 3,727,494 | 4/1973 | Rohs | 82/9 |
| 3,795,161 | 3/1974 | Berbalk | 82/20 |
| 3,880,025 | 4/1975 | Kralowetz et al. | 82/9 |
| 4,090,422 | 5/1978 | Berbalk | 82/9 |

FOREIGN PATENT DOCUMENTS 1418079 12/1975 United Kingdom ............ 82/9

Primary Examiner—Harrison L. Hinson
Attorney, Agent, or Firm—Kurt Kelman

[57] ABSTRACT

A steady is coupled to a longitudinal slide and comprises a driven chuck. A milling tool is carried by a tool slide, which is slidably mounted on the longitudinal slide for a transverse movement derived from the rotation of the workpiece. To prevent a sagging or twisting of the workpiece or inaccuracies resulting from thermal expansion and also to eliminate the need for complicated driven chucks in workpiece carriers and to enable a milling of cross-sections to very close tolerances, two workpiece carriers are provided with non-driven workpiece supports whereas drive means for rotating the workpiece are associated only with the chuck of the steady. The control of the transverse movement of the tool slide is derived from the rotation of the chuck or of the means for rotating the same.

6 Claims, 1 Drawing Figure

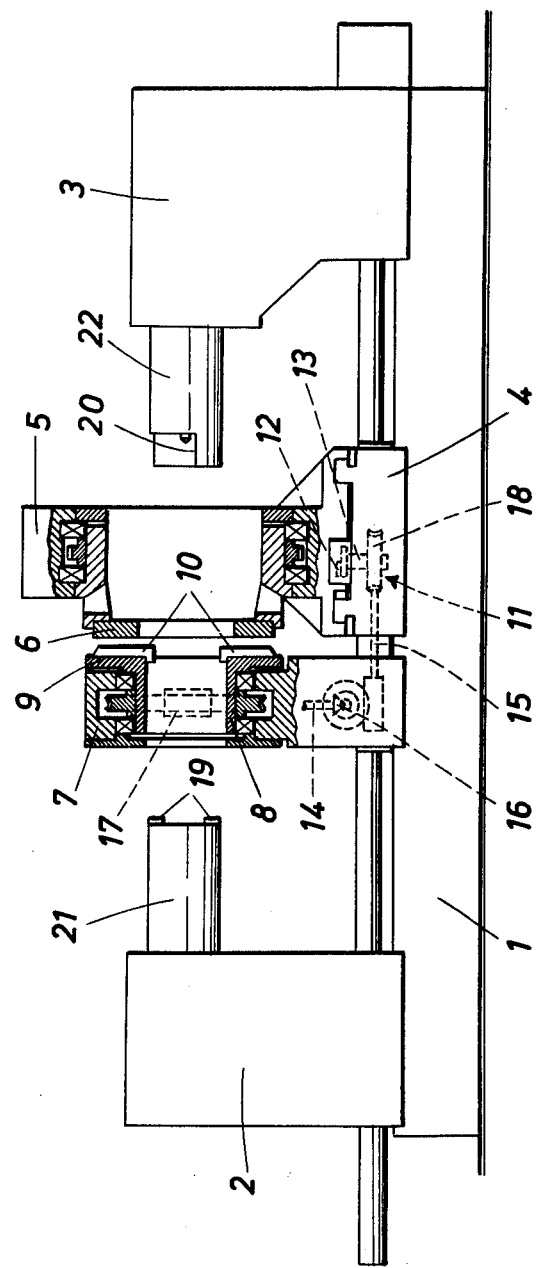

MILLING MACHINE

This invention relates to a milling machine, particularly for machining camshafts, comprising two workpiece carriers for supporting a rotating workpiece, at least one longitudinal slide, a tool slide, which is transversely slidably mounted on the longitudinal slide and carries a rotary milling cutter, which is an internally cutting annular milling cutter adapted to surround the workpiece, wherein the transverse movement of the tool slide is derived from the rotation of the workpiece, e.g., by a copying control system, and a steady is coupled to the longitudinal slide and provided with a chuck, which is adapted to be driven.

In view of the close tolerances which are required, most camshafts have previously been made by turning and grinding whereas milling, although it is more economical, has been used only for a preliminary machining of the cams because a machining of the cams to their finished shape to the desired accuracy with the known milling machines would involve an excessively high expenditure. For that purpose it would be necessary to eliminate the influences of the deflection of the workpiece under the action of the cutting forces, the thermal expansion of the workpiece during the milling operation, and the twisting of the workpiece by the drive means required for a simple copy milling. This has previously been accomplished by workpiece carriers provided with driven chucks and by a steady. The means for driving the chucks and the synchronization of the chucks of the workpiece carriers and the chuck of the steady involve a complicated and heavy structure of the milling machine and said synchronization of the drive means is an additional source of inaccuracy.

It is an object of the invention to eliminate these disadvantages and to provide a milling machine which is of the kind described first hereinbefore and which ensures a manufacture of highly exact cross-sectional shapes without need for a particularly high structural expenditure and for this reason permits of an advantageous milling of camshafts. This object is accomplished according to the invention in that the workpiece carriers comprise non-driven workpiece supports, rotary drive means for rotating the workpiece are associated only with the chuck of the steady, and the control of the transverse movement of the tool slide is derived from the rotation of the chuck or the rotary drive means. The workpiece is gripped and driven only by the steady, which prevents sagging and twisting of the workpiece or an inaccuracy due to a thermal expansion during the milling of a cross-section because the workpiece is always gripped close to the milling cutter. Besides, the steady eliminates the need for complicated driven chucks in the workpiece carriers so that very simple supports are sufficient in the workpiece carriers. As a result, there is no need for a synchronization between the workpiece supports of the workpiece and carriers and between said workpiece supports and the chuck of the steady. This reduces the structural expenditure and ensures a more exact rotation of the workpiece and a higher accuracy of the means for controlling the transverse movement of the tool in dependence on the rotation of the workpiece. Because this control, which may be effected by any desired mechanical, hydraulic or numerical control means, is directly derived from the drive means for driving the chuck of the steady, the risk of inaccuracies in the control movement caused, e.g., by a twisting of long transmission shafts, is eliminated so that a perfect agreement between the rotation of the workpiece and the transverse movement of the tool slide and tool and a milling of cross-sections to extremely close tolerances are possible.

According to an advantageous preferred feature of the invention, the workpiece supports of the two workpiece carriers consist of a gripping device and a bearing surface respectively. That gripping device serves to grip the workpiece and to hold it in its set up position only when the chuck of the steady is open, e.g., when it is desired to change the position of the steady. As soon as the chuck of the steady is effective, the gripping device of the workpiece end carrier opens and the workpiece can then rotate freely. Because the gripping device of the workpiece carrier is required to grip the workpiece only in position of rest, it does not involve a particularly high expenditure.

The distance between the workpiece portion gripped by the steady and the cross-section which is to be machined is not the same with all workpieces. For this reason a preferred feature of the invention resides in that the axial distance between the milling cutter and the chuck of the steady is adjustable and the adjustment may be effected automatically.

According to a preferred feature of the invention the chuck of the steady comprises a drum, which is adapted to be driven and surrounds the workpiece and has at one end an annular flange, in which radially adjustable gripping jaws are guided, the workpiece supports of the workpiece carriers are provided in known manner on protruding necks, and the steady together with the chuck provided thereon is adapted to be shifted toward the adjacent workpiece carrier beyond its workpiece support to surround its neck, just as is the case with internally cutting milling cutters. Such a drumlike chuck of the steady is stable and can easily be driven. Besides, a steady which comprises such chuck can be moved so closely to the workpiece carriers that the workpiece can easily be gripped near the workpiece carriers and the entire length of the milling machine between the workpiece carriers is available for receiving the workpiece, just as is possible with internally cutting annular milling cutters.

An illustrative embodiment of the milling cutter according to the invention is strictly diagrammatically shown in a side elevation, partly in section, on the accompanying drawing.

A machine bed 1 is provided with two workpiece carriers 2, 3. A longitudinal slide 4 is mounted on the bed 1 for movement thereon and carries a transversely movable tool slide 5, which is provided with an internally cutting, annular rotary milling cutter 6. A steady 7 is coupled to the longitudinal slide 4 at an adjustable distance therefrom and comprises a chuck consisting of a driven drum 8, which has a flange 9 at its end facing the milling cutter 6, and radially adjustable gripping jaws 10 guided in said flange 9. To enable the milling cutter 6 to mill a desired cross-sectional shape in dependence on the rotation of the workpiece, a transverse movement is imparted to the tool slide 5, e.g., by a copying control system 11, which comprises a template 12, which corresponds to the cross-section to be milled. That template 12 revolves with the workpiece so that the required component of transverse movement of the tool slide 5 can be derived from said template. To ensure an exact agreement between the rotations of the workpiece and the template 12, a copying spindle 13 which carries the template 12 is operatively connected to the drum 8 of the chuck of the steady. This is accomplished by synchronizing shafts 14, 15, bevel gearing 16 and worm gearing 17, 18. Because during the milling operation the workpiece is gripped, indexed and rotated only by the steady, it is sufficient to provide workpiece carriers 2, 3 having simple supports for the workpiece. The workpiece may be supported in the workpiece carrier 2 by a gripping device 19, which is adapted to hold the workpiece in position when the gripping jaws 10 of the steady are open, and in the workpiece carrier 3 by a simple bearing surface 20. To enable a movement of the tool slide 5 with its milling cutter 6 as well as of the stay 7 and its chuck beyond the adjacent workpiece supports 19, 20, the latter supports are provided on protruding necks 21, 22 of the workpiece carriers 2, 3.

What is claimed is:

1. A milling machine comprising
   (a) a frame,
   (b) workpiece carriers mounted on the frame and spaced apart in a first direction,
   (c) non-driven workpiece supports on the workpiece carriers and adapted to support a rotatable workpiece,
   (d) a longitudinal slide mounted on the frame for movement in the first direction,
   (e) a tool slide carried by the longitudinal slide for movement in a second direction transverse to the first direction,
   (f) an internally cutting, annular milling cutter mounted on the tool slide and adapted to surround a respective one of the workpieces supported by the workpiece supports,
   (g) a steady coupled to the longitudinal slide for movement in the first direction,
   (h) a chuck on the steady for gripping the workpiece supported by the workpiece supports,
   (i) rotary drive means operable to rotate the chuck and constituting the only means for rotating the workpiece supported by the workpiece supports, and
   (j) means for moving the tool slide in the second direction in dependence on the rotation of the chuck.

2. A milling machine as set forth in claim 1, which comprises copy control means for moving said tool slide in dependence on the rotation of said chuck.

3. A milling machine as set forth in claim 1, in which said rotary drive means are operatively connected to said tool slide to move the latter in said second direction in dependence on the rotation of said chuck.

4. A milling machine as set forth in claim 1, in which
   said workpiece support of one of said workpiece carriers comprise a gripping device adapted to grip said workpiece and
   said workpiece support of the other of said tool carriers comprises a bearing surface for supporting said workpiece.

5. A milling machine as set forth in claim 1, which comprises coupling means connecting said steady to said longitudinal slide so that said steady is spaced apart in said first direction by a predetermined distance from the milling cutter mounted on said tool slide, said coupling means permitting of a change of said distance.

6. A milling machine as set forth in claim 1, in which
   said chuck comprises a drum rotatable by said rotary drive means on an axis extending in said first direction and adapted to support the workpiece supported by said workpiece supports,
   said drum has an end which is adjacent to said tool slide and formed with a flange,
   said chuck further comprises a plurality of jaws radially slidably guided in said flange,
   said workpiece carriers have necks which protrude from said workpiece carriers toward each other and are provided with said workpiece supports, and
   said steady, inclusive of said chuck, is adapted to be moved in said first direction toward one of said workpiece carriers to surround said neck thereof beyond said workpiece support.

* * * * *